United States Patent [19]

Reed

[11] 4,208,567
[45] Jun. 17, 1980

[54] WELDABLE INSTRUMENTATION INSTALLATION TOOL

[75] Inventor: Stuart E. Reed, Deerfield, Ohio

[73] Assignee: The Babcock & Wilcox Company, New Orleans, La.

[21] Appl. No.: 968,061

[22] Filed: Dec. 11, 1978

[51] Int. Cl.$^2$ .................. B23K 11/10; B23K 11/30; B23K 37/04
[52] U.S. Cl. .................. 219/86.1; 219/66; 219/119; 228/47
[58] Field of Search .......... 219/59.1, 66, 67, 86.1, 219/86.24, 87, 119; 228/47, 49 R, 49 A

[56] References Cited
U.S. PATENT DOCUMENTS

| | | | |
|---|---|---|---|
| 2,596,453 | 5/1952 | Weidel | 219/66 |
| 3,076,086 | 1/1963 | Adams | 219/86.1 X |

FOREIGN PATENT DOCUMENTS

| | | | |
|---|---|---|---|
| 2388630 | 12/1978 | France | 219/87 |
| 1017630 | 1/1966 | United Kingdom | 219/86.1 |
| 504624 | 4/1976 | U.S.S.R. | 228/47 |

Primary Examiner—Bruce A. Reynolds
Assistant Examiner—Keith E. George
Attorney, Agent, or Firm—Robert J. Edwards; Edward A. Steen; Stephen R. Doody

[57] ABSTRACT

An instrumentation installation tool (30) for weldably attaching strain gages (20) or other instrumentation to the interior of a steam generator tube (42). The exterior surface of the section (32) is formed with four longitudinal grooves (32A, 36B, 36C and 38). A welding slot (44) is situated in one of the grooves (38). A ramp (46), oriented within the section (32) is in close proximity to the slot (44). Additionally, an elongated multitipped electrode (80) is slidably and coaxially disposed within the section (32).

8 Claims, 12 Drawing Figures

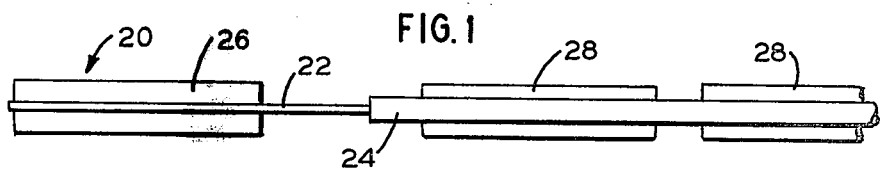
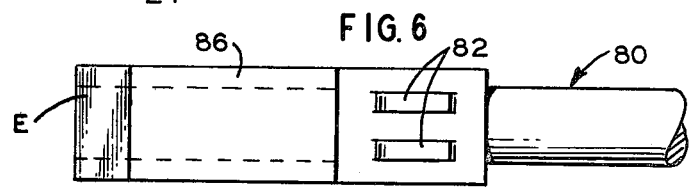
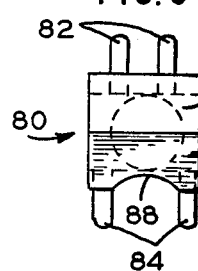
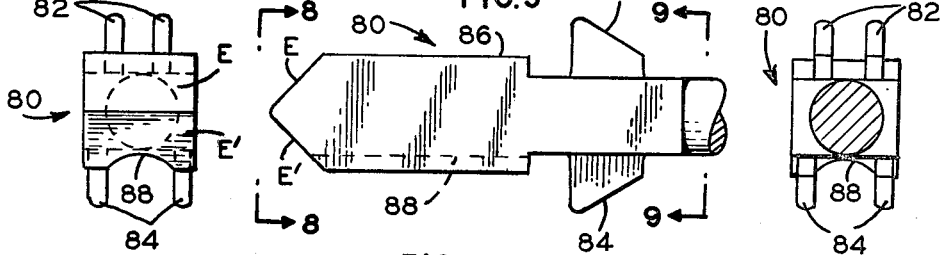
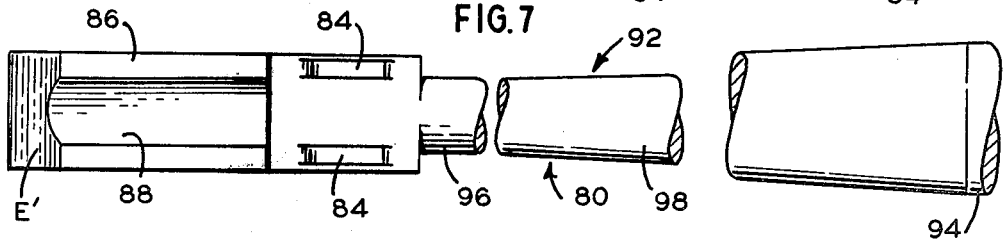
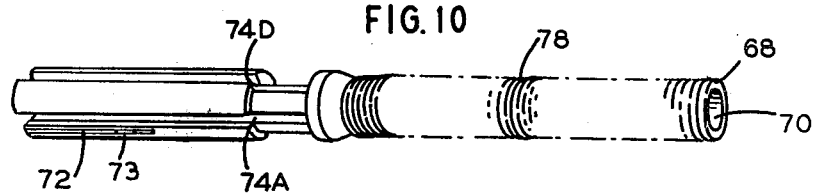
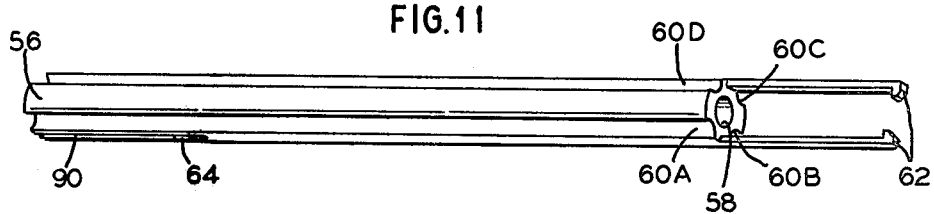

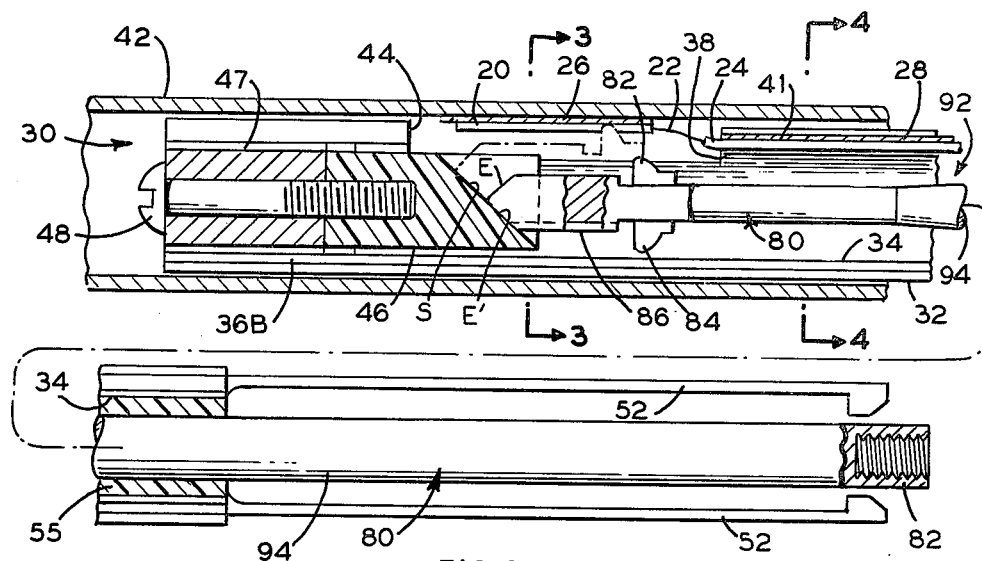
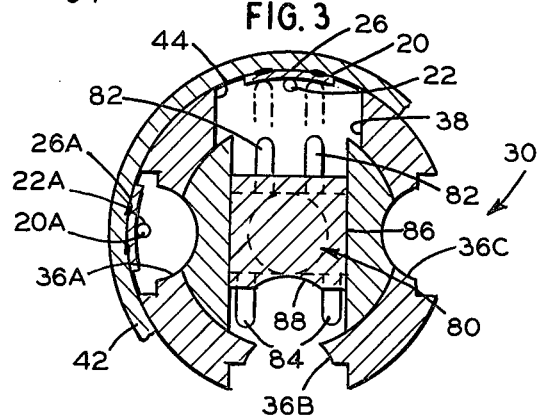
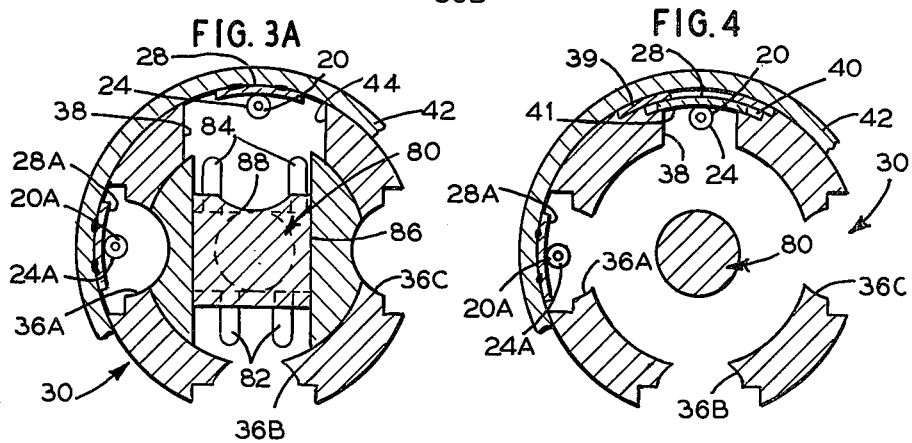

WELDABLE INSTRUMENTATION INSTALLATION TOOL

TECHNICAL FIELD

This invention relates to measuring instruments in general and specifically to an apparatus for attaching an instrument to a relatively inaccessible workpiece.

BACKGROUND ART

During the normal course of steam generator operation, it may be necessary to quantitatively measure the degree of stress and strain experienced by various steam generator tubes disposed within the generator. However, due to the nature of steam generator construction, the external surfaces of these tubes are frequently inaccessible. As a consequence, techniques have been developed to bond strain gages to the inner surface of the tubes. Unfortunately, these techniques are generally unsatisfactory. Moreover, many of the gages are unsuitable for installation within the generator; they are incapable of withstanding the severe service conditions encountered within the tubes.

There is, however, a commercially available strain gage ideally suited for steam generator tube installation. This gage may be attached to a tube by known capacitive discharge spot welding techniques. Unfortunately, the tooling presently available for such an operation is both hand held and hand operated. Furthermore, the tooling required is too bulky for use in confined spaces. Other attachment techniques require access to both ends of the tube, as well as access to the inner and outer diameters of the tube at the exact point of strain gage placement.

Clearly, an improved apparatus for attaching a strain gage to the internal surface of a steam generator tube is necessary and desirable.

SUMMARY OF THE INVENTION

By inserting the disclosed installation tool into a previously selected steam generator tube, a suitable strain gage may be successfully spot welded to the interior surface of the tube at a desired depth while simultaneously surmounting the previously enumerated difficulties.

Accordingly, the strain gage installation tool consists of a cylindrical welding section that includes an internal circular passageway extending throughout the section. The exterior surface of the section is formed with four equidistant longitudinal grooves. Each groove is sized to accommodate a single strain gage. A welding slot, situated in one of the grooves, is disposed at one end of the section. A nylon inclined plane or ramp, oriented within the section, is in close proximity to the slot. Finally, an elongated multitipped electrode is disposed within the section. Provision is allowed for attaching extension pieces to both the welding section and the electrode.

After loading the tool with the strain gage, the tool is inserted into the selected tube to an appropriate depth. The electrode is then pushed up the ramp to physically force the gage against the inner wall of the tube. The energized electrode spot welds the gage to the wall. The tool, free of the gage, is then removed from the tube.

BRIEF DESCRIPTION OF THE DRAWINGS

FIG. 1 is a plan view of a strain gage.
FIG. 2 is a sectional view of the invention.
FIG. 3 is a cross-sectional view taken along line 3—3 of FIG. 2.
FIG. 3A is a modified view of FIG. 3.
FIG. 4 is a cross-sectional view taken along line 4—4 of FIG. 2.
FIG. 5 is a partial side view of an electrode.
FIG. 6 is a partial top plan view of an electrode.
FIG. 7 is a partial bottom plan view of an electrode.
FIG. 8 is a view taken along line 8—8 of FIG. 5.
FIG. 9 is a view taken along line 9—9 of FIG. 5.
FIG. 10 is a perspective view of a retraction piece.
FIG. 11 is a perspective view of an extension piece.

BEST MODES FOR CARRYING OUT THE INVENTION

Referring to FIG. 1, there is shown a strain gage 20. As was previously discussed, most strain gages are incapable of withstanding the severe service conditions encountered within a steam generator tube. However, the hermetically sealed Ailtech Model SG 128/11 high temperature strain gage (hereinafter referred to as the gage 20) has proved to be a satisfactory choice under such conditions.

The gage 20 has a sensing element (not shown) housed within strain tube 22. Leadwires (not shown) are enclosed within sheath 24. Flexible mounting flange 26 is affixed to the strain tube 22 so that the gage 20 may be welded to the inner wall of a steam generator tube. Similarly, flexible leadwire restraints 28 are affixed to the sheath 24 so that upon spot welding the restraints 28 to the tube wall, any undersirable motion of the gage 20 will be reduced to a minimum.

FIG. 2 depicts a weldable strain gage installation tool 30 loaded with the gage 20 and inserted within steam generator tube 42. The tool 30 includes welding section cylinder 32. The cylinder 32 contains a long arcuate or circular longitudinal passageway 34 extending therethrough. Furthermore, the cylinder 32 is formed with four external longitudinal grooves 36A, 36B, 36C and 38. Groove 38 includes a flange 39 and a ledge 40 milled along a portion of the length of the groove 38 to provide a mounting surface space 41 for the gage 20. See FIG. 4. Furthermore, the groove 38 is sized to provide clearance for an electrode 80 and the mounted gage 20. The grooves 36A, 36B and 36C are sized to accommodate gages that have been previously welded to the inside of the steam generator tube 42. To illustrate this point, strain gage 20A is shown welded to the tube 42. Note that the "A" designation has been employed merely to distinguish the previously welded gage 20A from the gage 20. However, the various delineated gage components are, obviously, identical. See FIGS. 3, 3A and 4.

Welding slot 44 is formed within the groove 38. The slot 44 communicates directly with the passageway 34. Ramp 46, having an inclined surface S, is situated near the base of the tool 30 and is in registry with the welding slot 44. The ramp 46 may be constructed of nylon or any other electrically insulating material that exhibits good stiffness and bearing strength. Moreover, for reasons that will become readily apparent, the ramp 46 should possess some natural lubricity. Screw 48 detachably affixes the wedge 46 to the base 47 of the tool 30. In order to load (or remove) the electrode 80, the screw 48, ramp 46 and base 47 are removed to provide access to the passageway 34. The electrode 80 is then inserted (or removed) through the base 47 of the tool 30.

Insulating spacer sleeve 55 is disposed about section 94 of the electrode 80 in order to prevent electrical shorting between the electrode 80 and the cylinder 32. Preferably, the sleeve 55 should be constructed from Teflon. (Teflon is a registered trademark of the E. I. duPont de Nemours and Company).

Tangs 52 are employed to attach the tool 30 to extension piece 56. See FIG. 11. A pair of channels 90 (only one is shown) receive the tangs 52. Furthermore, a pair of slots 64 (only one is shown) act as grasping means for the tangs. The extension piece 56 is similar in construction to the welding section cylinder 34 in that it includes an arcuate passageway 58, four grooves 60A, 60B, 60C and 60D and two tangs 62. Note, however, that groove 60D of the extension piece 56 is not milled as is groove 38 of the cylinder 32. It should be appreciated that the extension piece 56 merely facilitates welding within deep steam generator tubes. The actual welding procedure occurs only through the offices of the cylinder 32.

Referring to FIG. 10, it may be observed that retraction piece 68 is somewhat similar to the previously discussed components in that it too includes an arcuate passageway 70, a pair of channels 72 (only one of which is shown) and a plurality of grooves 74A, 74B, 74C. Grooves 74B and 74C are obstructed by the particular representation selected. Additionally, however, the retraction piece 68 includes a threaded section 78. Slots 73 (only one is shown) receive the tangs.

Electrode 80 includes a chisel-shaped electrode head 86, electrode tip pairs 82 and 84 and stem 92. See FIG. 2 and FIGS. 5 through 9.

The electrode 80 is specifically designed to make two spot welds simultaneously. As a consequence, the electrode 80 is equipped with spaced and opposed electrode tip pairs 82 and 84. The electrode head 86 includes two inclined surfaces E and E'. Moreover, the head 86 is formed with a lower channel 88. In the preferred embodiment of the invention, the spacing between the individual tips comprising each tip pair is dissimilar. The entire electrode 80 may be constructed from copper or any other suitable material. Moreover, the electrode 80 includes a threaded female member 82. An electrode extension member (not shown), equipped with a matched threaded male member, may be utilized when necessary. The electrode stem 92 is divided into three sections. Section 94 is circumscribed by the insulating spacer 55 whereas section 96 is sized to reflect the reduced space available in the vicinity of the welding spot 44. Tapered section 98 joins the two sections 94 and 96 together.

The invention and the manner of applying it may, perhaps, be better understood by a brief discussion of the principles underlying the invention.

Briefly, resistance spot welding employs intense localized heating to effect the desired union between the components that are to be joined together. The heat, which precipitates localized melting, results from the resistance encountered by the electric current as it flows between the components. If localized mechanical pressure is applied to the weld site during the heating process, the melted sections will tend to flow together, thereby resulting in a bond between the two surfaces.

Referring now to FIGS. 2, 3, 3A and 4, there is shown a loaded tool 30 both prior to and during the actual welding procedure.

In order to load the tool 30, the gage 20, or more particularly the flexible mounting flange 26 and the leadwire restraints 28, are inserted into the space 41 situated between the flange 39 and the ledge 40 until the mounting flange 26 is in registry with the welding slot 44. After the gage 20 is in place, the retraction piece 68 is attached to the cylinder 32, via the grasping tangs 52. It is assumed that the electrode 80 has been previously inserted into the tool 30. In appropriate cases, one or more extension pieces 56 and electrode extension (not shown) may be employed to position the tool 30 at the desired depth within the tube 42.

Whereas, coarse depth adjustments may be accomplished by attaching successive extensions to the aforementioned components, fine tool 30 depth adjustments are accomplished by advancing the threaded retraction piece 68 by appropriate means (not shown). As an aside, it should be appreciated that the pitch of the thread 78 of the retraction piece 68 will determine the degree of fine adjustment control one will possess in positioning the tool 30 within the tube 42.

FIG. 2 depicts the tool 30 in position for the initial welding of the gage 20 to the tube 42. Note how the electrode tip pair 82 face the welding slot 44. At this juncture, the electrode 80 is pushed towards the ramp 46 and is then energized in a manner well known in the art. Surface S and surface E' operate in tandem to force the electrode head 86 up the ramp 46 until the electrode tip pair 82 is in direct contact with the gage 20 and in direct contact with the tube 42. See the phantom lines in FIG. 2 and FIG. 3. The energized electrode 80 then spot welds the mounting flange 26 to the inner wall of the tube 42 on both sides of the strain tube 22.

After the initial dual spot weld has been completed, the electrode 80 is then retracted through a selected distance by rotating a nut (not shown) on the retraction piece 68. All subsequent welds performed upon the mounting flange 26 are completed by following the abovementioned steps.

It has been determined that for steam generator tube applications, each weld should be spaced approximately 1/32 of an inch apart. Therefore, for ease of operation, the thread pitch 78 should be selected in such a manner so that one complete rotation of the nut (not shown) will advance or retract the tool 30 1/32 of an inch.

After the mounting flange 26 has been securely welded to the tube 42, the tool 30 is retracted until the welding slot 44 is in close proximity with the first leadwire restraint 28. Again, the abovedescribed welding procedure is followed except the electrode 80 must be rotated 180° so that the electrode tip pair 84 is now in registry with the slot 44. See FIG. 3A. Additional leadwire restraints are welded in the same manner.

The electrode 80 must be rotated because it is designed to effect two spot welds simultaneously, one on either side of the strain tube 22 when welding the mounting flange 26 to the tube 42 and one on either side of the sheath 24 when welding the leadwire restraints 28 to the tube 42. Electrode tip pair 82 is designed to straddle the strain tube 22 whereas electrode tip pair 84 is designed to straddle the sheath 28. As a consequence, both tip pairs are opposed fron one another so as to allow one pair of tips to be in contact with the appropriate portion of the gage 20. By virtue of this construction, the tips comprising electrode tip pair 84 are, of necessity, spaced wider apart than the tips of electrode tip pair 82. By the same token, channel 88 is sized to accommodate the thicker sheath 24. See FIG. 7.

After the gage 20 has been securely welded to the tube 42, the tool 30 is withdrawn and may be reloaded with a second gage if necessary. In the preferred embodiment, the tool 30 may be employed to weld as many as four gages to a single tube wall, each gage spaced 90° from an adjacent gage. However, the tool may be easily modified to accommodate more or fewer gages and/or at different angle orientations and depths.

Although the above discussion relates essentially to the installation of a strain gage to the inner wall of a steam generator tube, it should be fully appreciated that the tool may be utilized for the installation of other types of instrumentation as well. For example, the tool may be employed to install thermocouples within the steam generator tubes. Furthermore, it should be understood that the tool is not limited to steam generator tube applications; rather, the tool may be successfully employed within any type of tube.

While in accordance with the provisions of the statutes there is illustrated and described herein specific embodiments of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. An installation tool for weldably joining measuring instrumentation to the inner surface of a tube comprising a cylindrical welding section, the section including a plurality of longitudinal grooves formed about the exterior surface of the section, an internal passageway extending throughout the section, a welding slot formed within one of the grooves and disposed near one end of the section, an electrically insulated inclined plane disposed within said passageway and in registry with the slot, an elongated multitipped welding electrode coaxially and slidably disposed within the passageway, a plurality of grasping tangs affixed to the section, and means for mounting the instrumentation to the tool.

2. The tool according to claim 1 wherein the mounting means includes at least one of the longitudinal grooves having a flange and a ledge milled along both sides of the groove thereby forming a mounting surface space for the instrumentation.

3. The tool according to claim 1 wherein the multitipped electrode includes an electrode stem, a chisel-shaped electrode head affixed to one end of the stem, two pairs of dissimilarly spaced electrode welding tips intermediately disposed between the head and the stem, the tip pairs opposed 180 degrees apart from one another and a longitudinal channel formed in the head, the channel disposed adjacent to the wider tip pair.

4. The tool according to claim 1 including a retraction piece, the retraction piece comprising a cylinder, a plurality of longitudinal grooves extending along a portion of the external surface of the cylinder, the remaining portion of the cylinder circumscribed by a threaded section of known pitch, and a plurality of receiving channels for the grasping tangs formed between the grooves, each channel formed with a slot therein.

5. The tool according to claim 1 including an extension piece, the extension piece including a cylinder, a plurality of longitudinal grooves extending along the exterior surface of the cylinder, a plurality of receiving channels for the grasping tangs, the channels formed between the grooves, each channel formed with a slot therein, and a pair of grasping tangs affixed to the cylinder.

6. The tool according to claim 1 wherein the inclined plane is made from nylon.

7. The tool according to claim 1 wherein the instrumentation is a strain gage.

8. The tool according to claim 1 wherein the instrumentation is a thermocouple.

* * * * *